March 24, 1964   F. M. MAPLES ETAL   3,125,898
PORTABLE BRAKE LOCK
Filed Feb. 8, 1961
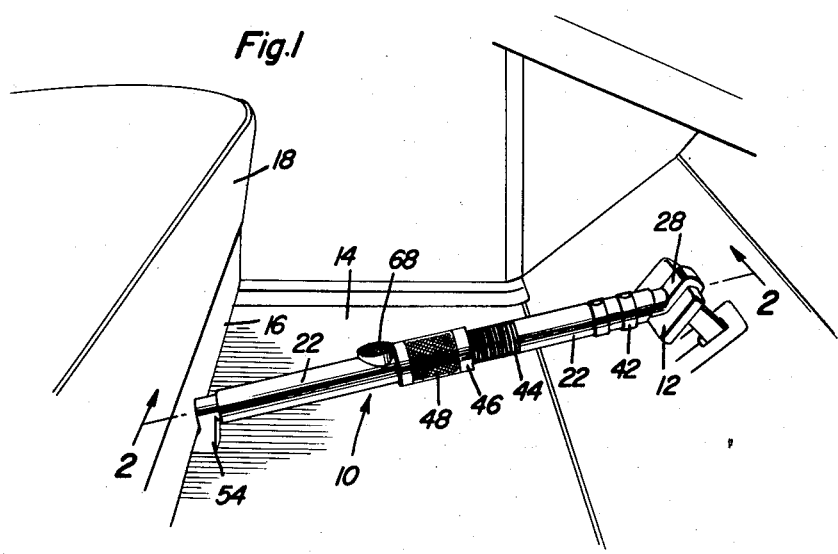
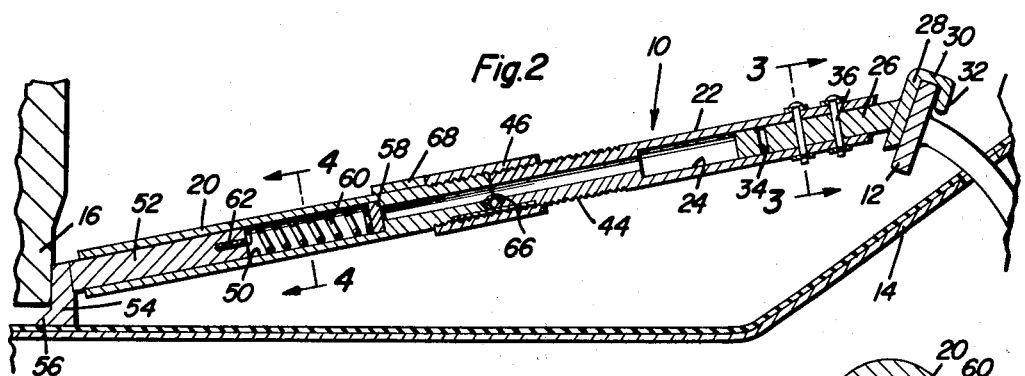
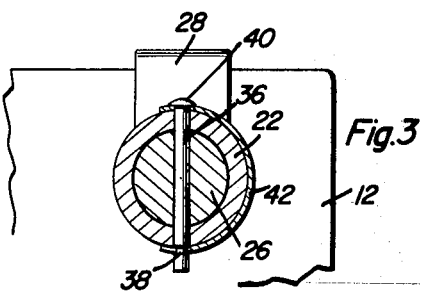
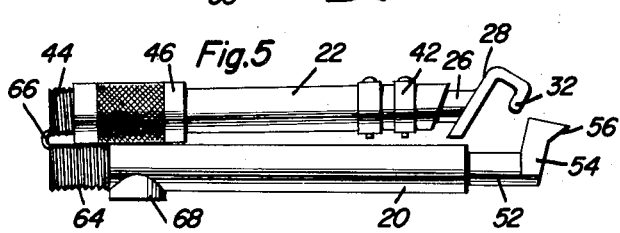
Frederick M. Maples
Sumner P. Rhodes
John F. Wynn, Jr.
INVENTORS.

United States Patent Office 3,125,898
Patented Mar. 24, 1964

3,125,898
PORTABLE BRAKE LOCK
Frederick M. Maples, 519 Rock Creek Church Road NW.;
Sumner P. Rhodes, 5027 E. Capitol St.; and John F.
Wynn, Jr., Box 361, Station 40, all of Washington, D.C.
Filed Feb. 8, 1961, Ser. No. 87,792
6 Claims. (Cl. 74—532)

The present invention generally relates to an accessory for use with an automobile and more particularly to a brake lock for retaining the wheel brakes effectively locked on all four wheels of a vehicle or on all of the wheels of the vehicle having brakes actuated by the normally provided foot pedal.

Conventionally, passenger-type vehicles are provided with brakes on all four wheels which are actuated by a foot pedal. As an emergency brake or parking brake, there is usually a hand operated lever and ratchet mechanism which is connected with the brakes of only the rear wheels for locking the rear wheel brakes. While this is adequate for normal parking purposes, the normally provided emergency brake or parking brake is inadequate in certain instances such as when it is desired to elevate one of the wheels of the vehicle for purposes of changing a tire or the like. Other types of vehicles have a parking brake provided on the drive shaft or the like which is also sometimes inadequate.

In present day vehicle structure, a bumper jack is normally employed for elevating one of the wheels for changing a tire or the like and since the bumper jack will tilt or fall if there is any movement of the vehicle in relation to the ground, there exists a problem of maintaining the vehicle stationary especially when one of the rear wheels is elevated for changing the tire and especially when the vehicle is parked on an inclined surface.

Therefore, it is the primary object of the present invention to provide a simple but highly effective brake lock which will effectively retain the foot pedal in a depressed position for locking all brakes on the vehicle and maintaining them in the locked position thereby enabling a bumper jack to be employed regardless of the nature of the surface on which the vehicle is disposed.

The present invention also will find use for temporarily maintaining the brakes applied under various conditions such as when repairs are being made on the vehicle or the driver otherwise has temporarily left the vehicle thus maintaining the vehicle in the stationary condition desired.

Another object of the present invention is to provide a brake lock in the form of a foldable, longitudinally adjustable and resiliently telescopic member extending between the bottom edge of the front seat and the normally provided brake pedal for maintaining the brake pedal in depressed operative condition whether the pedal be the type which extends through the floor board or which is suspended from the fire wall of the vehicle.

A further important object of the present invention is to provide a brake lock in accordance with the preceding object which is foldable generally in the center thereof for enabling the device to be readily stored in a compact condition and also enabling foot pressure to be exerted on the device adjacent the point of folding so that foot pressure may be employed for straightening the device in position thus depressing the foot pedal for effectively applying the brakes.

Still another important feature of the present invention is the provision of a portable, foldable and resilient brake lock which is quite simple in construction, easy to use, effective for its particular purposes and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the brake lock of the present invention illustrating the manner in which it is installed;

FIGURE 2 is a longitudinal, vertical sectional view taken substantially upon the plane passing along section line 2—2 of FIGURE 1 illustrating the structural details of the invention;

FIGURE 3 is a transverse, sectional view taken substantially upon a plane passing along section line 3—3 of FIGURE 2 illustrating the structural details of the removable pins for adjusting the length of the brake lock;

FIGURE 4 is a transverse, sectional view taken substantially upon a plane passing along section line 4—4 of FIGURE 2 illustrating the construction of the spring mechanism for continuously retaining spring pressure upon the brake pedals; and FIGURE 5 is a side elevational view of the brake lock of the present invention in folded condition ready for storage.

Referring now specifically to the drawings, the numeral 10 generally designates the brake lock of the present invention employed for maintaining the foot pedal 12 of a vehicle brake system in a depressed condition. While the foot pedal 12 has been illustrated as being the type which extends through the floor board 14, the device is also adapted for use with that type of brake pedal that is pivotally suspended from the firewall or other suitable supporting structure for swinging movement in a vertical plane. One end of the brake lock 10 engages the foot pedal 12 while the other end engages the bottom front edge 16 of the front seat 18 of the vehicle. While the front seat 18 is usually adjustable, the seat is usually left in position after it has been initially set for a particular driver. The structure of the brake lock enables adjustment thereof for adapting it to various positions of the seat 18 and various distances between the foot pedal 12 and the bottom edge 16 of the seat 18 thereby enabling the brake lock to be employed with various types of vehicles having various orientations of brake pedals 12 and front seats 18.

The brake lock 10 includes a pair of tubular members 20 and 22 which are illustrated as being circular in cross-section but which may be of any suitable cross sectional configuration, at least for a portion of their length.

The tubular member 22 is provided with a longitudinal bore 24 therein which communicates with the outer end and which receives a rod or shaft 26 therein. The outer end of the rod or shaft 26 is provided with a generally inverted J-shaped or hook-shaped member 28 for engagement over the top edge of the brake pedal 12. The J-shaped member 28 includes a flange 30 overlying the top edge of the brake pedal and a depending flange 32 disposed behind the top edge portion of the brake pedal 12 thus retaining the brake lock connected with the brake pedal 12.

The rod or shaft 26 is provided with a plurality of longitudinally spaced transverse apertures 34 for receiving a pair of removable lock pins 36. Each of the lock pins 36 is provided with a groove 38 adjacent one end thereof and a head 40 adjacent the other end. A flexible retainer 42 is connected to the pin 36 under the head 40 and extends around the tubular member 22 and is engaged in the groove 38 thereby releasably retaining the pin 36 in position. By removing the pin 36 and longitudinally adjusting the rod of shaft 26, the J-shaped or hook-shaped member 28 may be adjusted longitudinally in relation to the tubular member 22.

The other end of the tubular member 22 is provided with an externally threaded portion 44 receiving an externally threaded sleeve 46 having a knurled or roughened portion 48 thereon for facilitating hand manipulation of the sleeve 46. The threaded portion 44 of the tubular member 22 must, of course, be circular in cross-sectional configuration for enabling rotation of the sleeve 46 which is preferably cylindrical but may be other shapes such as octagonal or the like. The length of the threaded portion 44 is such that when the sleeve 46 is threaded thereon, the sleeve may be completely received on the threaded portion.

The tubular member 20 is provided with a longitudinal bore 50 therein slidably receiving a rod or shaft 52 in the outer end thereof which projects outwardly from the tubular member 20 and terminates in a depending body member 54 having an outwardly projecting lower end portion 56 forming an adapter to engage the front surface of the bottom edge portion 16 of the front seat 18. The bottom of the body 54 is flat and engages the upper surface of the floorboard 14 thus effectively forming a secure abutment with the seat 18.

The inner end of the bore 50 is provided with a transverse abutment member 58 which is engaged by one end of a coil compression spring 60 having the other end engaged with and secured to the rod or shaft 52 as at 62. The connection between the spring 60 and the rod or shaft 52 may be of any suitable construction and the other end of the spring 60 is also connected with the abutment 58 which is rigid with the tubular member 20 thereby retaining the rod or shaft 52 within the confines of the tubular member 20. Any suitable means may be provided for preventing the rod or shaft 52 from being pulley out of the tubular member but at the same enabling the spring 60 to spring bias the rod or shaft 52 outwardly for exerting spring bias against the brake pedal 12 in an obvious manner.

The end of the tubular member 20 remote from the rod or shaft 52 is provided with a threaded portion 64 for screw threadedly receiving the internally threaded sleeve 46 for locking the tubular members 20 and 22 in alignment as illustrated in FIGURE 2. A hinge device 66 interconnects the tubular members 20 and 22 in such a manner that the adjacent ends thereof may be disposed in abutting engagement as illustrated in FIGURE 2 and hinged to the position illustrated in FIGURE 5 when folded. This may be accomplished by any suitable hinge means including a flexible member connected to the respective tubular section in any manner thus enabling the tubular members 20 and 22 to fold upwardly about hinge device 66 after the sleeve 46 has been retracted and screwed onto the screw threaded portions 44. Upward pressure may be exerted under the point of connection between the tubular members 20 and 22 and these members may be made to pivot upwardly about the hinge axis formed by the end memebr 66.

When installing the brake lock, foot pressure may be exerted on the tubular member 20, which is slightly longer than member 22, by virtue of a pedal 68 formed on the tubular member 20 adjacent the threaded portion 64 thus enabling the driver to push his foot in a straight downward motion upon pedal 68, thus applying direct pressure to the pedal 68 which causes movement of the brake pedal 12 as the members 20 and 22 are brought into alignment with each other. This will be accomplished by having the central portion or hinged portion of the tubular members 20 and 22 disposed above a straight line extending between the bottom of the seat and the brake pedal whereupon straightening pressure being exerted on the foot pedal 68 will cause the members 20 and 22 to pivot downwardly into alignment with each other and at the same time over the brake pedal 12 to a position for applying the brake at all wheels of the vehicle.

With this device installed, the brakes on all four wheels of the vehicle may be locked thus enabling one of the wheels to be more safely elevated off of the ground surface regardless of the incline of the vehicle and otherwise enabling the brakes to be applied without requiring the driver or operator to apply continuous foot pressure on the brake pedal by use of the foot.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be reosrted to, falling within the scope of the invention as claimed.

What is claimed as new is as follows:

1. A brake lock for maintaining a foot pedal brake actuator of a vehicle in depressed operative position comprising a pair of tubular members of substantially equal length disposed in end-to-end relation, means interconnecting the adjacent ends of the tubular members for retaining the tubular members in alignment, means on the outer ends of one of said tubular members for engagement with the foot pedal, means longitudinally slidably mounted on the outer end of the other tubular member for engagement with a floor-board and the lower edge portion of a front seat of a vehicle, and spring means biasing said last named means longitudinally outwardly of the tubular member for continuously exerting pressure on the foot pedal, said means retaining the tubular members in aligned condition including a threaded portion on each of said tubular members, an internally threaded sleeve engaging the threaded portions for retaining them in alignment, hinge means interconnecting the adjacent edges of the tubular members thus hingedly interconnecting the tubular members, and a foot pedal on one of said tubular members adjacent said hinge means and in diametrically opposed relation to the hinge means whereby foot pressure may be exerted on the adjacent ends of the tubular members for forcing them into aligned condition and at the same time exerting pressure on the foot pedal brake actuator.

2. The structure as defined in claim 1 wherein said means for engaging the foot pedal includes a generally J-shaped adapter conforming witch and engaging around the top edge of the foot pedal, a rod extending from the adapter and telescopically received in said one tubular member, and means interconnecting the rod and said one tubular member for adjusting the rod and adapter in relation to the tubular members.

3. The structure as defined in claim 2 wherein said last named means includes a plurality of transverse pins removably mounted in the end of the tubular member, said rod having a plurality of longitudinally spaced transverse apertures extending therethrough for selectively receiving the pins thereby enabling longitudinal adjustment of the rod in relation to the tubular member.

4. The structure as defined in claim 3 wherein said means slidably mounted on the other tubular member includes a rod telescopically received in the other tubular member, said spring means including a coil compressed spring disposed in the tubular member and having one end anchored to the tubular member and the other end anchored to the rod thereby retaining the rod in the tubular member but biasing it longitudinally outwardly, said rod including an adapter on the outer end thereof for engagement with the floor board and front seat of a vehicle.

5. The structure as defined in claim 4 wherein said adapter on the outer end of the rod includes a laterally offset body, said body including a flat bottom surface for engagement with the top surface of a floor board, said body also including an inclined bottom edge portion facing rearwardly for generally conforming to the front surface of the lower edge portion of a vehicle seat.

6. A brake lock for maintaining a foot pedal brake actuator of a vehicle in depressed operative position comprising a pair of tubular members of substantially equal length disposed in end-to-end relation, means interconnecting the adjacent ends of the tubular members for retaining the tubular members in alignment, means on the outer end of one of said tubular members for engagement with the foot pedal, means longitudinally slidably mounted on the outer end of the other tubular member for engagement with a floorboard and the lower edge portion of a front seat of a vehicle, and spring means biasing said last named means longitudinally outwardly of the tubular member for continuously exerting pressure on the foot pedal, said means retaining the tubular members in aligned condition including a threaded portion on each of said tubular members, an internally threaded sleeve engaging the threaded portions for retaining them in alignment, hinge means interconnecting the adjacent edges of the tubular members thus hingedly interconnecting the tubular members, and a foot pedal on one of said tubular members adjacent said hinge means and in diametrically opposed relation to the hinge means whereby foot pressure may be exerted on the adjacent ends of the tubular members for forcing them into aligned condition and at the same time exerting pressure on the foot pedal brake actuator, said means for engaging the foot pedal including a generally J-shaped adapter conforming with and engaging around the top edge of the foot pedal, a rod extending from the adapter and telescopically received in said one tubular member, and means interconnecting the rod and said one tubular member for adjusting the rod and adapter in relation to the tubular members, said last named means including a plurality of transverse pins removably mounted in the end of the tubular member, said rod having a plurality of longitudinally spaced transverse apertures extending therethrough for selectively receiving the pins thereby enabling longitudinal adjustment of the rod in relation to the tubular member, said means slidably mounted on the other tubular member including a rod telescopically received in the other tubular member, said spring means including a coil compressed spring disposed in the tubular member and having one end anchored to the tubular member and the other end anchored to the rod thereby retaining the rod in the tubular member but biasing it longitudinally outwardly, said rod including an adapter on the outer end thereof for engagement with the floorboard and front seat of a vehicle, said adapter on the outer end of the rod including a laterally offset body, said body including a flat bottom surface for engagement with the top surface of a floorboard, said body also including an inclined bottom edge portion facing rearwardly for generally conforming to the front surface of the lower edge portion of a vehicle seat, said foot pedal on said tubular member being disposed at the end of the threaded end portion thereby forming an abutment for limiting the longitudinal movement of the sleeve in relation to the tubular members.

References Cited in the file of this patent

UNITED STATES PATENTS

| | | |
|---|---|---|
| 695,222 | Mooers | Mar. 11, 1902 |
| 1,156,789 | Lough | Oct. 12, 1915 |
| 1,286,161 | Wagner | Nov. 26, 1918 |
| 1,475,890 | Schmuck | Nov. 27, 1923 |
| 1,820,950 | Schulstadt | Sept. 1, 1931 |
| 2,138,911 | Evans et al. | Dec. 6, 1938 |
| 2,694,318 | Smith et al. | Nov. 16, 1954 |
| 2,711,228 | Shank | June 21, 1955 |
| 2,820,626 | Hedeen | Jan. 21, 1958 |
| 2,932,504 | Avery | Apr. 12, 1960 |
| 2,960,885 | Donaldson | Nov. 22, 1960 |